3,196,076
ANTI-DEPRESSANT 10-(3-DIMETHYLAMINO-
PROPYL)-3-AZAPHENOTHIAZINE
Frank H. Clarke, Jr., North Caldwell, N.J., assignor to
Schering Corporation, Bloomfield, N.J., a corporation
of New Jersey
No Drawing. Filed Dec. 20, 1961, Ser. No. 160,933
4 Claims. (Cl. 167—65)

This invention relates to the use of 10-(3-dimethylaminopropyl)-3-azaphenothiazine, as the free base and as the nontoxic acid addition salts thereof, as an anti-depressant compound, and to the novel compositions of matter containing such as anti-depressant compound.

10-(3-dimethylaminopropyl) - 3 - azaphenothiazine is a chemical compound having the structural formula:

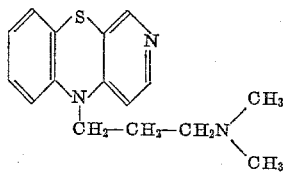

the nomenclature assigned to such a compound being in accord with the system set forth in the Revised Ring Index—RRI 3314.

Specific exemplification for the preparation of 10-(3-dimethylaminopropyl)-3-azaphenothiazine as well as the preparation of some of the acid addition salts useful for this invention may be found in an article by F. H. Clarke, et al., Journal of Organic Chemistry, 26, 1126 (1961). Other acid addition salts, such as those formed with such acids as phosphoric acid, sulfuric acid, tartaric acid, citric acid, succinic acid, and the like, may readily be prepared by methods analogous to those set forth in the foregoing article.

While moderate success has been achieved in the treatment of mental depression in mammals with 5-(3-dimethylaminopropyl) - 10,11 - dihydro-5H-dibenz [b,f] azapine (Revised Ring Index—3689) and 5(3-dimethylaminopropyl)-10,11-dihydro-5H-dibenz [b,f] azapine-like compounds, the success has been limited to a relatively small percentage of the depression-states. As a consequence there exists a need for agents which are more generally applicable, as well as for agents which produce fewer undesirable autonomic and neurologic side-effects. It is therefore an object of this invention to provide a novel composition of matter that will satisfy such needs. Such an object is accomplished by the composition of this invention.

Using standard techniques and standard procedures, the toxicity of the compound of this invention was first evaluated in mice, and then in dogs, with favorable results. Effective anti-depressant activity in mammals may be evidenced by laboratory and clinical techniques wherein a depressed subject's reaction to the compositions of this invention is compared to the subject's reactions to chemical compounds known to have an anti-depressant effect. From these tests (tests, for example, such as those found described or referred-to in such articles as by D. R. Maxwell, H. T. Palmer, Nature, 191, 84 (1961) and by L. Stein, J. Seifter, Science, 134, 286 (1961)) it has been concluded that the compositions of this invention, in their effect upon the central nervous system, cause stimulated effects and altered performance of depressed subjects with few side-effects, and therefore, are useful in the treatment of mental depression in mammals caused by both laboratory-induced conditions and by multifarious modern-day stimuli.

The effective dosage of the active ingredient of the composition of this invention depends upon the severity, the stage, and the individual characteristic of each case and will be determined by the attending diagnostician. Generally, a dosage range of from about 0.1 mg. to about 5 mg. per kg. of body weight per day constitutes the overall range, with a range of from about 1 mg. to 2 mg. per kg. per day for the preferred form of active ingredient.

The compounds of my invention may be used in the form of pharmaceutical preparations which contain the new compound in admixture with a pharmaceutical carrier suitable for enteral or parenteral administration. In their preferred dosage unit forms the active ingredient is present in amounts of about 5 to 150 mg. Such preparations may be in solid forms, as for example tablets and capsules, or in liquid forms, as for example syrups, elixirs, emulsions, and injectables.

In the formulation of pharmaceutical preparations there can be employed such substances which do not react with the compounds, as for example, water, gelatin, lactose, starches, magnesium stearate, talc, vegetable oils, benzyl alcohols, gums, polyalkylene glycols, and petroleum jelly.

The following examples will serve to further exemplify the nature of these various formulations. These examples, however, are not intended and should not be construed in any way so as to limit the scope of the product formulation.

Example 1

[Syrup, 25 mg./teaspoonful]

| Ingredient: | Quantity |
|---|---|
| 10-(3 - dimethylaminopropyl) - 3 - azaphenothiazine dihydrochloride _____gm__ | 5.0 |
| Citric acid _____gm__ | 5.0 |
| Sodium citrate _____gm__ | 1.0 |
| Sodium benzoate _____gm__ | 1.0 |
| Sweet orange peel tincture _____ml__ | 50.0 |
| Sucrose _____gm__ | 800.0 |
| Purified water, q.s. to make 1.0 liter. | |

Dissolve successively the 10-(3-dimethylaminopropyl)-3-azaphenothiazine dihydrochloride, citric acid, sodium citrate, sodium benzoate and sucrose in sufficient water to make approximately 900 ml. Add the sweet orange peel tincture and sufficient water to make the product measure one liter. Agitate until uniform. Filter, using an appropriate filter aid if necessary, until the product is clear.

Example 2

[Injectable, 10 mg./ml.]

| Ingredient: | Quantity Gm. |
|---|---|
| 10 - (3 - dimethylaminopropyl) - 3 - azaphenothiazine dihydrochloride _____ | 10.0 |
| Sodium chloride, U.S.P. _____ | 9.0 |
| Methyl paraben _____ | 1.8 |
| Propyl paraben _____ | 0.2 |
| Benzyl alcohol, R.G. _____ | 9.0 |
| Water for injection, q.s. to make 1.0 liter. | |

Dissolve methyl and propyl parabens in the benzyl alcohol with the aid of heat and agitation. Add this solution to a volume of water for injection equal to 90% of the desired final volume and dissolve with agitation. Add and dissolve the sodium chloride. Add and dissolve the 10-(3-dimethylaminopropyl) - 3 - azaphenothiazine dihydrochloride. Add water for injection q.s. to final volume. Filter aseptically through appropriate sterile filter. Fill aseptically into 10 ml. rubber stoppered vials.

Example 3

[Tablets, 25 mg.]

| Ingredient: | Quantity Gm. |
|---|---|
| 10-(3 - dimethylaminopropyl) - 3 - azaphenothiazine dihydrochloride | 250.0 |
| Lactose | 1000.0 |
| Corn starch | 600.0 |
| Corn starch as 10% paste | 50.0 |

Mix the 10-(3 - dimethylaminopropyl) - 3 - azaphenothiazine dihydrochloride, lactose and corn starch, and pass through a pulverizing mill if necessary. Granulate the mix with the starch paste and add additional water if necessary to make a damp granulation. Pass the granulation through an impact mill to produce 8–12 mesh granules. Spread the granulation on trays and dry in a draft-oven at 35–40° C. Reduce the dried granulation to 16–24 mesh. Blend the foregoing 1900 grams of "wet" granulation with 80.0 gm. of cornstarch and 20.0 g. of magnesium stearate until a uniform mixture is obtained. Compress to 200 mg. tablets on 5/16 inch round punches.

This application is a continuation-in-part of my copending application Serial No. 847,056, filed on October 19, 1959, now Patent No. 3,118,884.

The invention may be otherwise variously embodied within the scope of the appended claims.

I claim:

1. The method of treating mental depression which comprises administering to a patient suffering from mental depression a therapeutically effective dose of an anti-depressant chemical compound selected from the group consisting of 10-(3-dimethylaminopropyl)-3 - azaphenothiazine and the non-toxic acid addition salts thereof.

2. The method of claim 1 wherein the daily quantity of active ingredient is between about 0.1 to 5 mg. per kilogram of body weight.

3. The method of treating mental depression which comprises administering to a patient suffering from mental depression a therapeutically effective dose of an anti-depressant chemical 10-(3-dimethylaminopropyl)-3-azaphenothiazine.

4. The method of treating mental depression which comprises administering to a patient suffering from mental depression a therapeutically effective dose of an anti-depressant chemical 10-(3-dimethylaminopropyl)-3-azaphenothiazine dihydrochloride.

References Cited by the Examiner

UNITED STATES PATENTS

| 2,799,619 | 7/57 | Seifter et al. | 167—65 |
| 2,872,376 | 2/59 | Bowes | 167—65 |
| 2,934,533 | 4/60 | Schuler et al. | 260—243 |
| 2,943,086 | 6/60 | Yale et al. | 260—243 |

FOREIGN PATENTS

| 217,538 | 1/57 | Australia. |

OTHER REFERENCES

Clarke et al.: J. Org. Chem., vol. 26, pages 1126–32 (April 1961).

JULIAN S. LEVITT, *Primary Examiner.*

IRVING MARCUS, M. O. WOLK, LEWIS GOTTS, *Examiners.*